(12) United States Patent
Yang et al.

(10) Patent No.: US 9,969,056 B2
(45) Date of Patent: May 15, 2018

(54) SPRAY GUN ADJUSTING DEVICE AND ADJUSTING METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Gui-Yun Yang, Shenzhen (CN); Kai Chen, Shenzhen (CN); Peng Hu, Shenzhen (CN); Zhao-Hui Men, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 240 days.

(21) Appl. No.: 14/690,652

(22) Filed: Apr. 20, 2015

(65) Prior Publication Data

US 2016/0176019 A1   Jun. 23, 2016

(30) Foreign Application Priority Data

Dec. 22, 2014   (CN) .......................... 2014 1 0799709

(51) Int. Cl.
*B24C 5/00* (2006.01)
*G01B 11/27* (2006.01)

(52) U.S. Cl.
CPC ................ *B24C 5/00* (2013.01); *G01B 11/27* (2013.01)

(58) Field of Classification Search
CPC .. B24C 5/00; B24C 1/04; G01B 11/27; G01B 3/20; G01B 21/042; G01B 21/16; G01B 2210/12; G01B 5/065; G01B 11/2504; G01B 11/14; F41G 1/54; F41G 1/545; B23Q 17/2423; B23Q 17/2414; B23Q 17/24; B25H 1/0078; B25H 1/0092
See application file for complete search history.

(56) References Cited

U.S. PATENT DOCUMENTS

| | | | | |
|---|---|---|---|---|
| 3,801,205 A | * | 4/1974 | Eggenschwyler ... | G01C 15/002 33/DIG. 21 |
| 3,986,002 A | * | 10/1976 | DeMaio .................... | G01S 7/48 235/78 R |
| 4,840,490 A | * | 6/1989 | Gabriel ................ | G01B 11/272 356/138 |
| 5,757,498 A | | 5/1998 | Klein, II et al. | |

(Continued)

FOREIGN PATENT DOCUMENTS

CN   203155443 U   8/2013

*Primary Examiner* — Christopher M Koehler
*Assistant Examiner* — Joel Crandall
(74) *Attorney, Agent, or Firm* — ScienBiziP, P.C.

(57) ABSTRACT

A spray gun adjusting device is configured to adjust a spray angle and a height of a spray gun. The spray gun adjusting device includes a laser with a spot and a scale plate. The scale plate includes an angle scale plate and a height scale plate. A distance between the laser and a center of the scale plate can be determined according to an intersection scale of the spot and the height scale plate, and an angle of the laser and the scale plate can be determined according to an intersection scale of the spot and the angle scale plate. A spray angle and a height of the spray gun are adjusted according to the intersection scales of the spot and the scale plate.

11 Claims, 6 Drawing Sheets

(56) References Cited

U.S. PATENT DOCUMENTS

| | | | | |
|---|---|---|---|---|
| 6,137,579 A * | 10/2000 | Reilley | ............... | G01B 11/27 356/399 |
| 6,266,143 B1 * | 7/2001 | Peterson | ............. | G01B 11/27 33/293 |
| 6,692,200 B2 * | 2/2004 | Peterson | ............ | B25H 1/0092 362/119 |
| 7,331,113 B1 * | 2/2008 | Patrick | ............. | B25H 1/0092 33/286 |
| 7,992,331 B2 * | 8/2011 | Schnuckle | ........ | A47G 19/2227 220/506 |
| 2003/0178503 A1 * | 9/2003 | Horan | ............... | B05B 12/004 239/73 |
| 2006/0101883 A1 * | 5/2006 | Garza | ................. | B24C 1/10 72/53 |

\* cited by examiner

SPRAY GUN ADJUSTING DEVICE AND ADJUSTING METHOD THEREOF

FIELD

The subject matter herein generally relates to spray gun adjusting devices.

BACKGROUND

In a sand blasting process, multiple factors such as a type of sand, spray pressure, a height and spray angle of the spray gun, can influence the effect of sand blasting. Usually, the height and the spray angle of spray gun can be adjusted manually.

BRIEF DESCRIPTION OF THE DRAWINGS

Implementations of the present technology will now be described, by way of example only, with reference to the attached figures.

DETAILED DESCRIPTION

Figure 1:
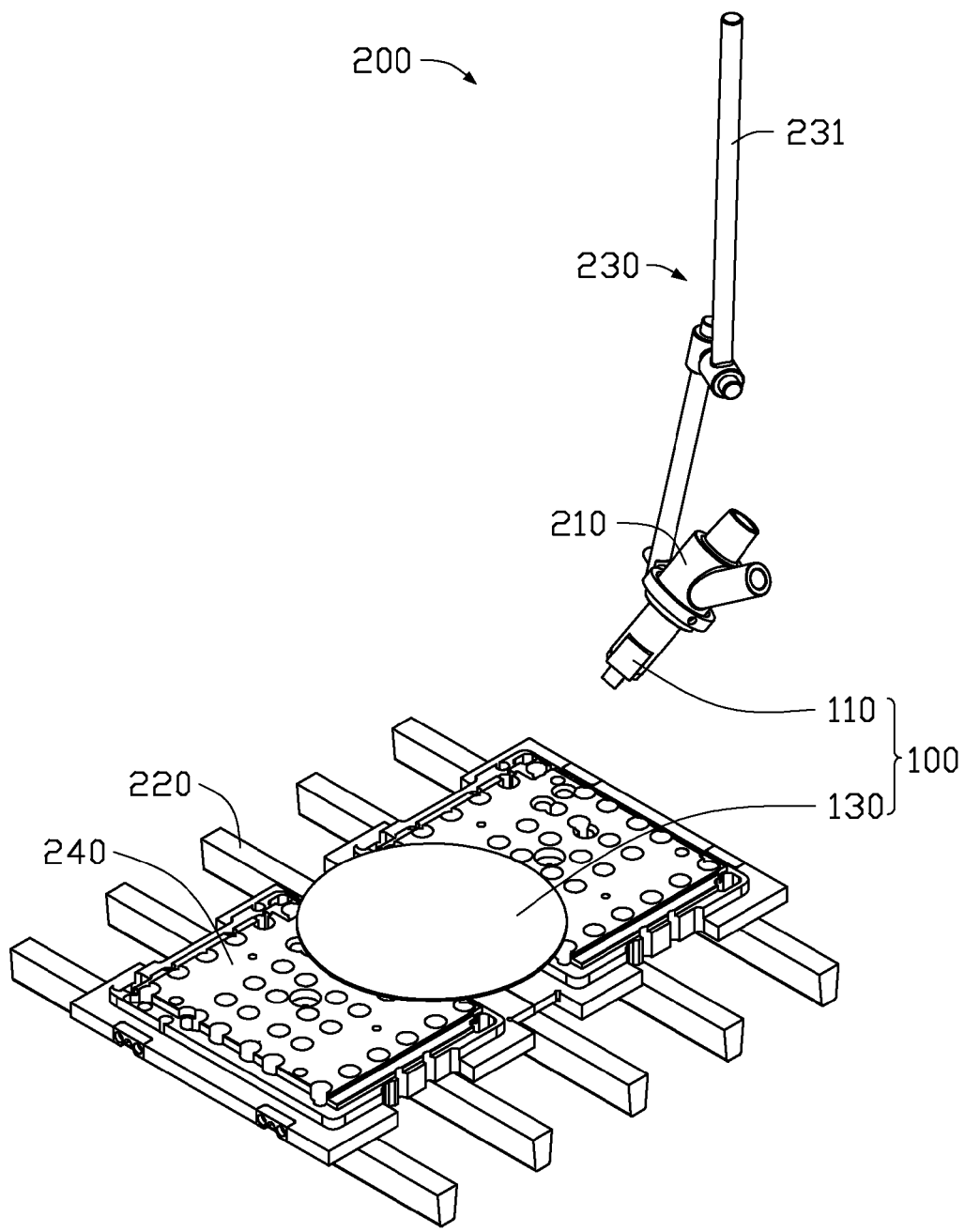
FIG. 1 is an isometric view of an embodiment of a spray gun adjusting device and a part of a sand blasting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates notch-ended inclusion or membership in the so-described combination, group, series and the like.

Figure 2:
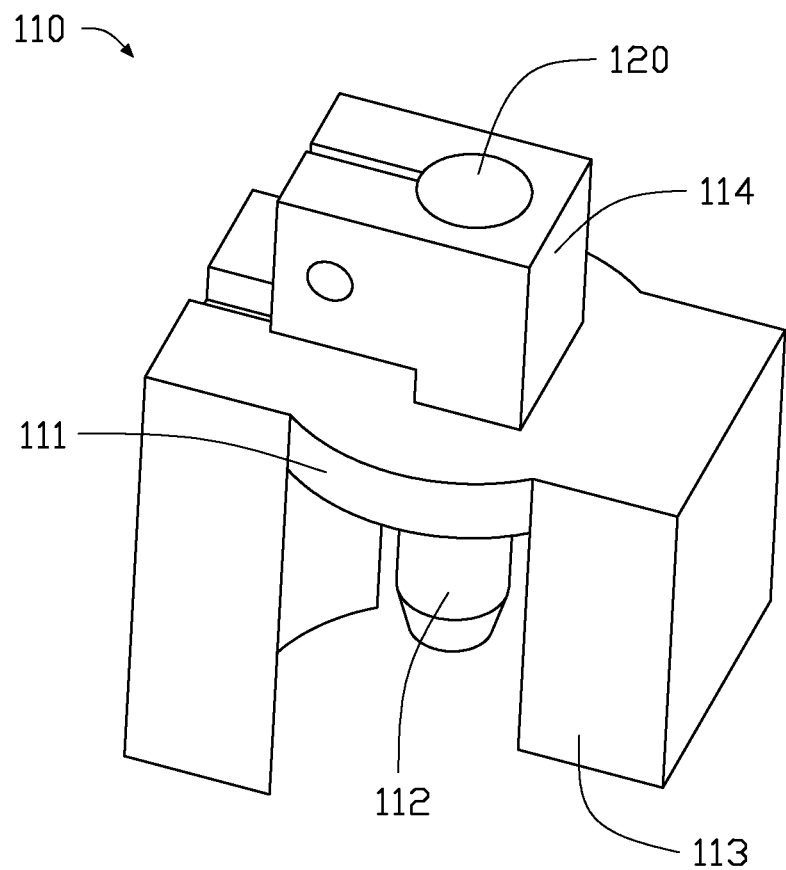
FIG. 2 is an isometric view of a fastening member and a laser of the spray gun adjusting device of FIG. 1.

The present disclosure is described in relation to a spray gun adjusting device and an adjusting method thereof FIG. 1 and FIG. 2 illustrate an embodiment of a spray gun adjusting device 100 configured to adjust a spray angle and a height of a spray gun 210 of a sand blasting apparatus 200. The sand blasting apparatus 200 can further include a conveyer belt 220, sand blasting mechanism (not shown), adjusting assembly 230 located at a side of the conveyer belt 220, and a fixture 240 positioned on the conveyer belt 220. The spray gun 210 can be positioned on an end of the adjusting assembly 230. The adjusting assembly 230 can include a plurality of connecting rods 231. The connecting rods 231 can be pivotal and connected to each other configured to adjust the spray angle and the height of the spray gun 210.

The spray gun adjusting device 100 can include a fastening assembly 110, a laser 120 positioned on the fastening assembly 110, and a scale plate 130. The fastening assembly 110 can include a main body 111, a location pin 112 positioned on the main body 111, a plurality of latching members 113 positioned around the location pin 112, and a fastening member 114 opposite to the location pin 112. The location pin 112 can be inserted into a nozzle (not labeled) of the spray gun 210, and the latching member 113 can be engaged to the nozzle (not labeled) to connect the laser 120 to the spray gun 210.

The laser 120 can be positioned on the fastening member 114 of the fastening assembly 110. The laser 120 can have a set emergence angle. A plurality of emitting light of the laser 120 can form a rectangular spot (not shown) with a cross cursor (not shown).

Figure 3:
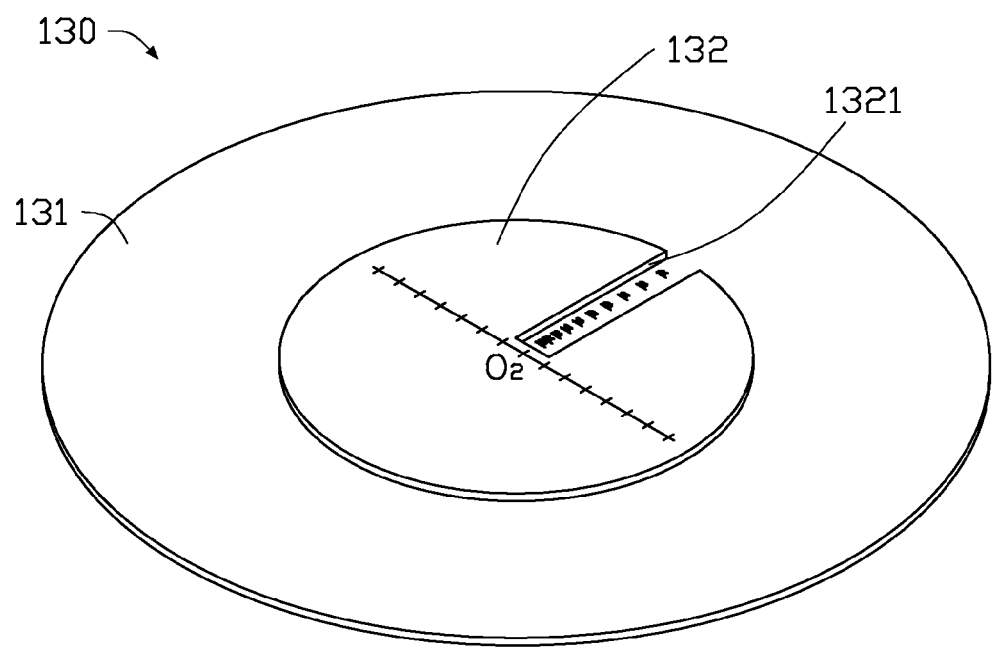
FIG. 3 is an isometric view of a scale plate of the spray gun adjusting device of FIG. 1.
Figure 4:
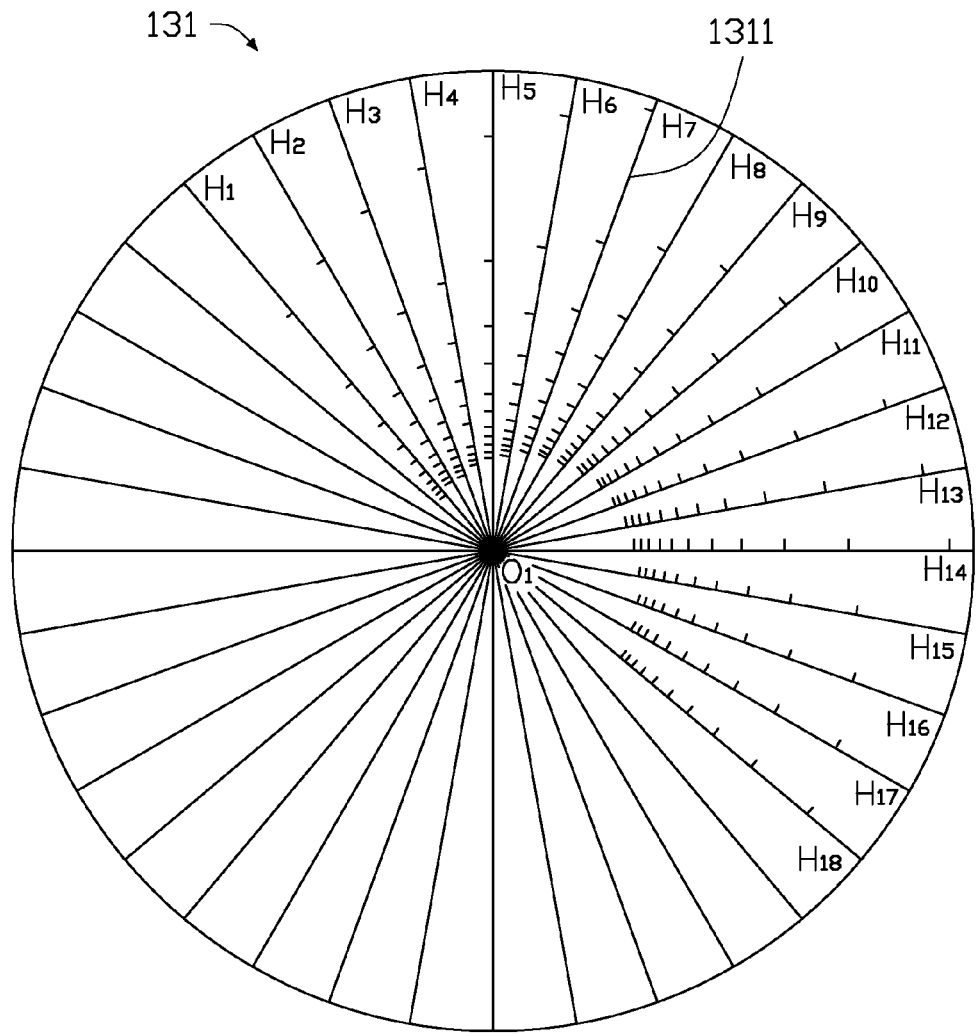
FIG. 4 is a diagrammatic view of an angle scale plate of the spray gun adjusting device of FIG. 1.
Figure 5:
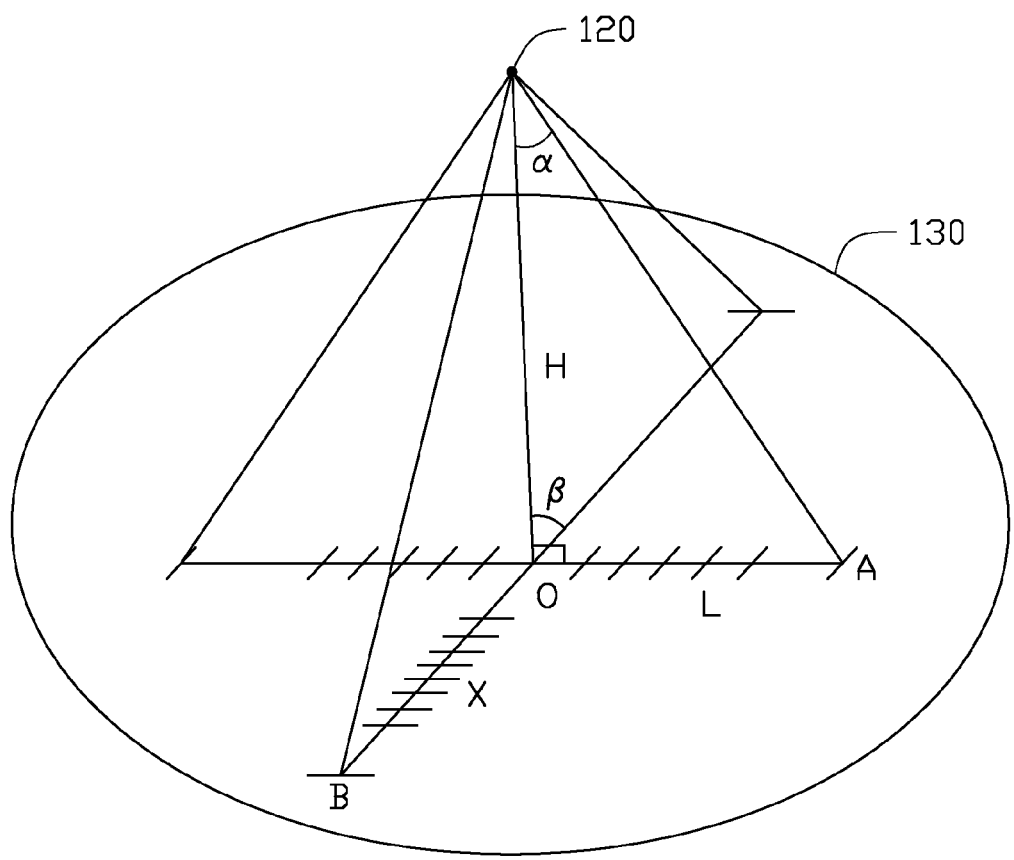
FIG. 5 is a diagrammatic view of labeling scale for the scale plate of the spray gun adjusting device of FIG. 1.

FIGS. 3-5 illustrate that the scale plate 130 can be substantially circular. The scale plate 130 can include an angle scale plate 131 and a height scale plate 132 positioned on the angle scale plate 131. The angle scale plate 131 can include a first center $O_1$ and a plurality of radial lines 1311 centered the first center $O_1$. A plurality of angle scales (not labeled) correspond to a height scale (such as $H_1$ or $H_2$, and so on) can be labeled on each of the radial lines 1311. A notch 1321 can be defined on an edge of the height scale plate 132. The notch 1321 can extend to a second center $O_2$ of the height scale plate 132. A plurality of height scales (not labeled) can be labeled on the height scale plate 132 along a direction perpendicular to the notch 1321. The height scales (not labeled) can be centrosymmetrical relative to the second center $O_2$. The first center $O_1$ can overlap the second center $O_2$. One of the radial lines 1311 can be received in the notch 1321 of the height scale plate 132. Another one of the radial lines 1311 can be received in the notch 1321 of the height scale plate 132 when the angle scale plate 131 is rotated.

When the cross cursor (not labeled) is overlapping a center O of the scale plate 130, the spot and the scale plate can form a plurality of intersection scales, such as A and B. A labeling scale principle of the angle scale plate 131 and the height scale plate 132 is as follows.

A distance L between the center O and the intersection scale A located on the scale plate 130 can be calculated by a relationship of L=H*tan α. Wherein, the α can be the set emergence angle of the laser 120. The H can be a height of the spray gun 210 that is a distance between the laser 120 and the center O of the scale plate 130. A plurality of values of H can be measured by a tool (not shown). A value of L the can be calculated according to a value of the H, that is a value of scale of the height scale plate 132 can be determined according to the value of L. As described above method, a plurality of values of scale of the height scale plate 132 can be labeled according to other values of H. On the contrary, a height of the spray gun 210 can be determined according to a scale value of the height scale plate 132.

A distance X between the center O and the intersection scale B located on the scale plate 130 can be calculated by a relationship of $X=H/\sin(\beta-\alpha)*\sin\alpha$. Wherein, the relationship of $X=H/\sin(\beta-\alpha)*\sin\alpha$ can be determined from a relationship of $X/\sin\alpha=H/\sin[180°-(180°-\beta+\alpha)]$. The $\beta$ can be an angle between the laser 120 and the scale plate 130, that is the $\beta$ can be a spray angle of the spray gun 210. A plurality of different values of $\beta$ can be measured by a tool (not shown). A value of X can be calculated according to a value of H and a value of $\beta$. Thus, a plurality of values of X on one radial line 1311 can be calculated according to the values of $\beta$ and a set value of $H_1$ or $H_2$ and so on. As described above method, a plurality of value of scale of each radial line 1311 can be labeled according to the different values of $\beta$ in a condition of different set heights of the spray gun 210. On the contrary, an angle of the spray gun 210 can be determined according to a scale value of the angle scale plate 131.

Figure 6:
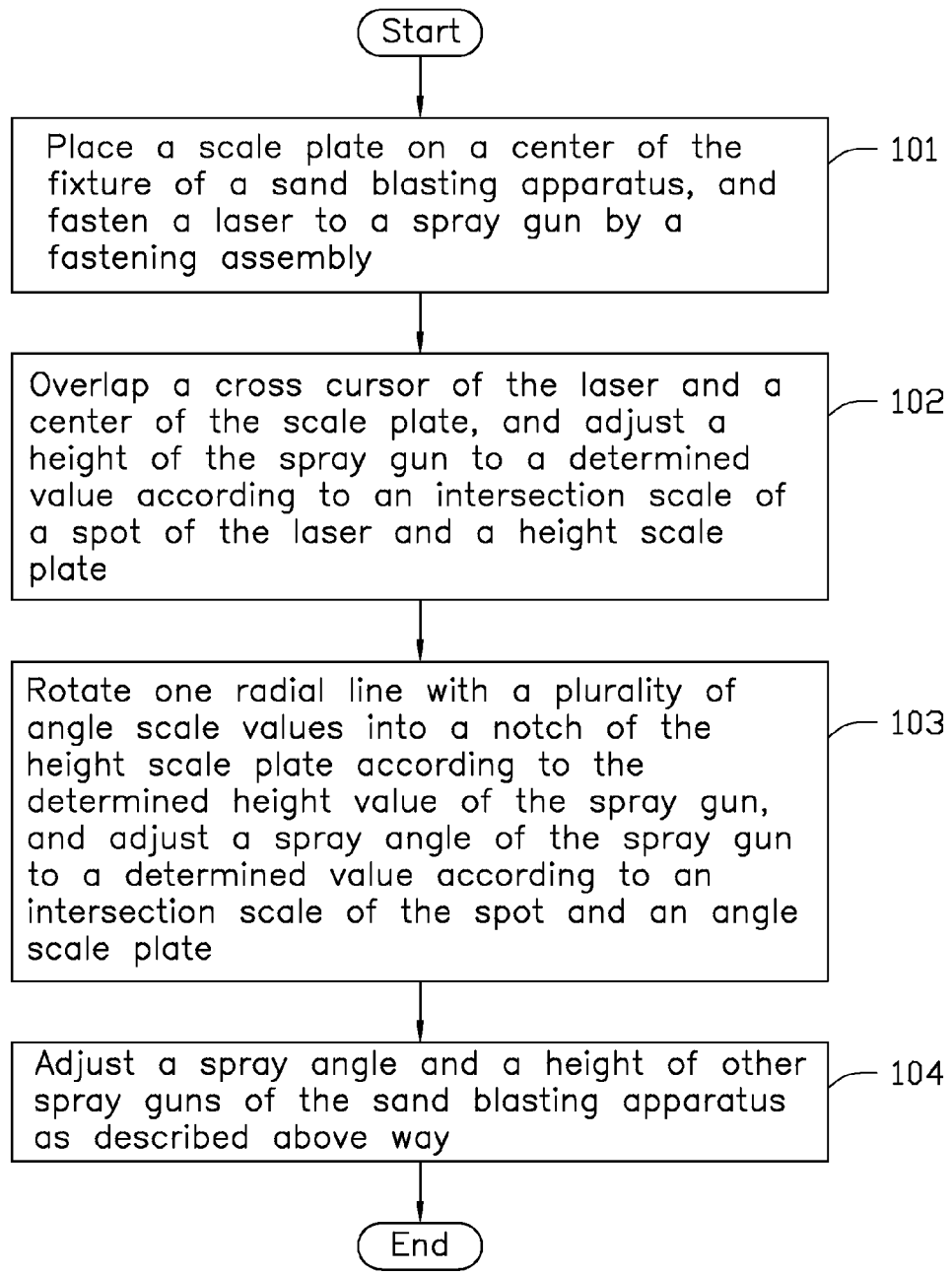
FIG. 6 is a flow chart of an embodiment of an adjusting method of the spray gun adjusting device of FIG. 1.

Referring to FIG. 6, a flowchart is presented in accordance with an example embodiment which is being thus illustrated. An adjusting method of the spray gun adjusting device 100 is provided by way of example, as there are a variety of ways to carry out the method. The adjusting method of the spray gun adjusting device 100 described below can be carried out using the configurations illustrated in FIGS. 1 to 5, for example, and various elements of these figures are referenced in explaining example adjusting method of the spray gun adjusting device 100. Each block shown in FIG. 6 represents one or more processes, methods or subroutines, carried out in the example adjusting method of the spray gun adjusting device 100. Additionally, the illustrated order of blocks is by example only and the order of the blocks can change according to the present disclosure. The adjusting method of the spray gun adjusting device 100 can begin at block 101.

At block 101, the scale plate 130 can be placed on a center of the fixture 240 of the sand blasting apparatus 200, and the laser 120 can be fastened to the spray gun 210 by the fastening assembly 110.

At block 102, the cross cursor (not labeled) of the laser 120 can be overlapping the center O of the scale plate 130, and a height of the spray gun 210 can be adjusted to a determined value according to an intersection scale of the spot (not labeled) and the height scale plate 132.

At block 103, one radial line 1311 with a plurality of angle scale values (not labeled) can be rotated into the notch 1321 of the height scale plate 132 according to the determined height value of the spray gun 210, and a spray angle of the spray gun 210 can be adjusted to a determined value according to an intersection scale of the spot (not labeled) and the angle scale plate 131.

At block 104, as described above, a spray angle and a height of other spray guns 210 of the sand blasting apparatus 200 can be adjusted.

As described above, the laser 120 can be positioned on the spray gun 210. The spray angle and the height of the spray gun 210 can be adjusted according to the intersection scales of the spot and the height scale plate 132, and the angle scale plate 131 respectively. Therefore, the spray gun 210 can be accurately positioned to improve accuracy and efficiency of the sand blasting apparatus 200.

The embodiments shown and described above are only examples. Many details are often found in the art such as the other features of a spray gun adjusting device and an adjusting method thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A spray gun adjusting device configured to adjust a spray angle and a height of a spray gun in a sand blasting apparatus, the spray gun adjusting device comprising:
   a laser positioned on the spray gun;
   a fastening assembly configured to fasten the laser to the spray gun; and
   a scale plate;
   wherein the fastening assembly comprises a main body, a location pin positioned on the main body, a plurality of latching members positioned around the location pin, and a fastening member opposite to the location pin;
   wherein the scale plate comprises an angle scale plate and a height scale plate, the height scale plate is positioned on the angle scale plate, and the height scale plate comprises a notch;
   wherein the angle scale plate can be rotated relative to the height scale plate to make a plurality of scales of the angle plate be located in the notch;
   wherein a plurality of emitting light of the laser forms a rectangular spot on the scale plate;
   wherein a distance between the laser and a center of the scale plate is determined according to an intersection scale of the spot and the height scale plate, and an angle of the laser and the scale plate is determined according to an intersection scale of the spot and the angle scale plate;
   wherein a spray angle and a height of the spray gun relative to the scale plate are adjusted according to the intersection scales of the spot and the scale plate; and
   wherein the notch is defined on an edge of the height scale plate and extends to a center of the height scale plate.

2. The spray gun adjusting device as claimed in claim 1, wherein a plurality of height scales are labeled on the height scale plate along a direction perpendicular to the notch.

3. The spray gun adjusting device as claimed in claim 2, wherein the height scales are centrosymmetrical relative to a center of the height scale plate.

4. The spray gun adjusting device as claimed in claim 1, wherein the angle scale plate comprises a plurality of radial lines centered a center of the angle scale plate.

5. The spray gun adjusting device as claimed in claim 4, wherein a plurality of angle scales correspond to a height scale.

6. The spray gun adjusting device as claimed in claim 1, wherein the laser is positioned on the fastening member.

7. The spray gun adjusting device as claimed in claim 1, wherein the sand blasting apparatus further comprises a conveyer belt, a sand blasting mechanism, an adjusting assembly located at a side of the conveyer belt, and a fixture positioned on the conveyer belt.

8. The spray gun adjusting device as claimed in claim 7, wherein the spray gun is positioned on an end of the adjusting assembly.

9. The spray gun adjusting device as claimed in claim 7, wherein the adjusting assembly comprises a plurality of connecting rods, the connecting rods are pivotal and connected to each other configured to adjust the spray angle and the height of the spray gun.

10. An adjusting method of a spray gun adjusting device comprising:
   placing a scale plate on a center of a fixture, and fastening a laser to a spray gun by a fastening assembly;
   overlapping a cross cursor of the laser and a center of the scale plate, and adjusting a height of the spray gun to a determined value according to an intersection scale of a spot of the laser and a height scale plate of the scale plate; and
   rotating one radial line with a plurality of angle scale values into a notch of the height scale plate according to the determined height value of the spray gun, and adjusting a spray angle of the spray gun to a determined value according to an intersection scale of the spot and an angle scale plate of the scale plate.

11. The adjusting method of the spray gun adjusting device as claimed in claim 10, wherein height scale plate is positioned on the angle scale plate.

* * * * *